United States Patent Office 3,047,632
Patented July 31, 1962

3,047,632
PROCESS FOR PREPARING TRIS-(4-METHYL-MERCAPTOPHENYL)-CARBINOL COMPOUNDS
Ludwig Harbort and Hans-Jürgen Rahn, Hannover, Germany, assignors to Günther Wagner, Hannover, Germany
No Drawing. Filed Aug. 28, 1961, Ser. No. 134,136
Claims priority, application Germany Aug. 29, 1960
9 Claims. (Cl. 260—609)

This invention generally relates to tris-(4-methylmercaptophenyl)-carbinol compounds and their derivatives and is particularly concerned with an improved process for preparing such compounds and derivatives.

Several processes have become known for the preparation of tris-(4-methylmercaptophenyl)-carbinols, but these processes are complicated and cumbersome and thus expensive to carry out, and moreover result in extremely low yields. For this reason, the known processes do not lend themselves for industrial production.

One of the known processes for the preparation of compounds of the nature referred to has been developed by K. Brandt and O. Stallmann, as reported in the Journal fuer Praktische Chemie, vol. 107, pp. 353-358. This process, although one of the simpler ones of the prior art processes, nevertheless requires eight process steps for finally producing tris-(4-methylmercaptophenyl)-carbinol. In addition, the yield of the process referred to is but 20% of the theoretical yield.

It is, therefore, a primary object of this invention to overcome the disadvantages of the prior art processes and to provide an improved, simplified process for the production of tris-(4-methylmercaptophenyl)-carbinol compounds and their derivatives which is simple to carry out and according to which the desired compound is obtained in high yields.

It is also an object of this invention generally to improve on the art of producing tris-(4-methylcarcaptophenyl)-carbinol compounds and their derivatives.

Briefly, and in accordance with this invention, we have ascertained that tris-(4-methylmercaptophenyl)-carbinol compounds and their derivatives may be prepared in an exceedingly simple manner and with excellent yields by using as starting material unsubstituted or substituted tris-(4-aminophenyl) carbenium chloride.

The benzene rings of the carbenium compound may be substituted by halogen atoms such as chlorine, fluor, bromine or iodine or by alkyl radicals of the general formula $C_nH_{2n+1}$. The rings may be substituted at any free position and the substituents may be the same or different. Thus, generically the starting compounds may be designated by the formula

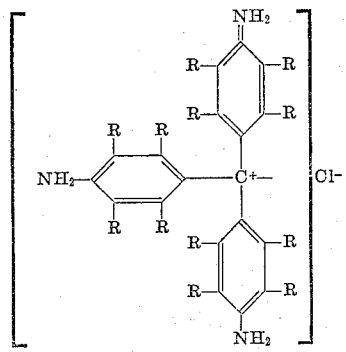

wherein each of the R's is hydrogen, halogen or alkyl. An example of a substituted carbenium compound would thus be

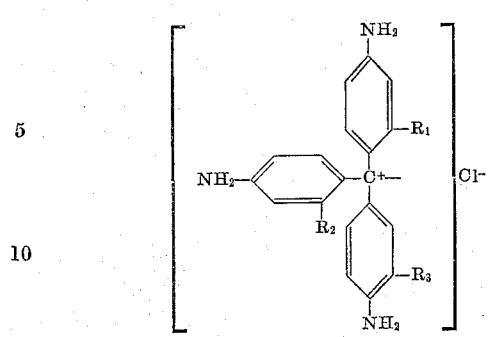

wherein $R_1$, $R_2$, and $R_3$ stand for halogen or alkyl.

The carbenium chloride of the indicated nature is subjected to diazotization in known manner by standard procedures and is subsequently reacted with xanthate, e.g. potassium ethyl xanthate at a temperature ranging between 60 and 70° C. The xanthic acid ether obtained thereby is filtered off, is thereafter dissolved in a suitable solvent such as ethyl glycol and is then saponified with, e.g. potassium hydroxide to form the corresponding mercaptide. The mercaptide is then methylated with dimethyl sulfate to obtain the desired final carbinol compound. If one proceeds in this manner, the yield, calculated on the starting compound, amounts to 90 to 95% of the theoretical value.

The invention will now be described by two examples, it being understood, however, that these examples are given by way of illustration and not by way of limitation and that many changes may be effected in the process conditions without departing in any way from the scope and spirit of this invention as defined in the appended claims.

Example I

The starting material consisted of 65 parts of (4-aminophenyl)-carbenium chloride (p-fuchsine chlorohydrate) which were dissolved in one liter of water. 175 parts of hydrochloric acid of a specific gravity of 1.16 were added and the diazotization was carried out with 41.5 parts of sodium nitrite dissolved in 130 parts of water. The diazotized reaction product was thereafter reacted at 60 to 70° C. with 256 parts of potassium ethyl xanthate dissolved in 650 parts of water. The xanthic acid ester obtained thereby was filtered off and was dissolved in 900 parts of ethyl glycol. The solution was thereafter saponified with 150 parts of potassium hydroxide whereby the corresponding mercaptide was obtained. Thereafter methylation was carried out in the usual manner with 325 parts of dimethyl sulfate, whereby tris-(4-methylmercaptophenyl)-carbinol was obtained as final product. The separated crude product was purified by heating with steam, whereby 71.5 parts of tris-(4-methylmercaptophenyl)-carbinol corresponding to 90% of the theoretical amount calculated on the starting material were obtained.

Example II

This example was carried out with 73.2 parts of tris-(4-amino-3-methyl-phenyl)-carbenium chloride dissolved in 1 liter of water. 175 parts of hydrochloric acid of a specific gravity of 1.16 were added and the diazotization was carried out with 41.5 parts of sodium nitrite dissolved in 130 parts of water. Subsequent reaction with 256 parts of potassium ethyl xanthate yielded an ester which was filtered off. The ester was thereafter dissolved in 900 parts of ethyl glycol and the solution was saponified with 150 parts of potassium hydroxide to yield the corresponding mercaptide. The mercaptide was thereafter methylated with 325 parts of dimethyl sulfate.

The crude separated final product was purified by heating with steam whereby 71.5 parts of tris-(4-methylmercapto-3-methyl-phenyl)-carbinol were obtained.

As previously set forth, the inventive process is not limited to the utilization of tris-(4-aminophenyl)-carbenium chloride proper, but its scope also embraces the use of tris-(4-aminophenyl)-carbenium chloride compounds which are alkyl- and/or halogen-substituted at the nuclei or which contain these substituents at the nucleus. If such substituted compounds are used, then, of course, the corresponding derivatives of tris-(4-methylmercaptophenyl)-carbinol in corresponding yields are obtained.

What is claimed is:

1. A process of preparing tris-(4-methylmercaptophenyl)-carbinol compounds and its derivatives which comprises subjecting to diazotization a carbenium chloride compound of the formula

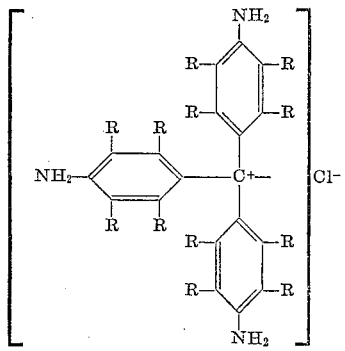

wherein each R stands for a member selected from the group consisting of hydrogen, halogen and alkyl, reacting the diazotization product with a xanthate to obtain the corresponding xanthic acid ester, saponifying the ester to the corresponding mercaptide and methylating the mercaptide.

2. A process as claimed in claim 1, wherein the ester is dissolved prior to saponification.

3. A process as claimed in claim 2, wherein ethyl glycol is used as solvent.

4. A process as claimed in claim 1, wherein the methylation is carried out with dimethyl sulfate.

5. A process as claimed in claim 1, wherein the final product is purified with steam.

6. A process as claimed in claim 1, wherein the xanthate is potassium ethyl xanthate.

7. A process as claimed in claim 1, wherein the reaction with the xanthate is effected at a temperature of between about 60–70° C.

8. A process of preparing tris-(4-methylmercaptophenyl)-carbinol which comprises diazotizing tris-(4-aminophenyl)-carbenium chloride with sodium nitrite, reacting the diazotization product at a temperature of about between 60–70° C. with potassium ethyl xanthogenate, whereby xanthic acid ester is obtained, separating the ester, dissolving the ester in ethyl glycol, saponifying the solution with potassium hydroxide to obtain the corresponding mercaptide and methylating the mercaptide with dimethyl sulfate.

9. A process for the preparation of tris-(4-methylmercapto-3-methyl-phenyl)-carbinol which comprises diazotizing tris-(4-amino-3-methyl-phenyl)-carbenium chloride with sodium nitrite, reacting the diazotization product at a temperature of about 60–70° C. with potassium ethyl xanthogenate, whereby xanthic acid ester is formed, dissolving the ester in ethyl glycol, saponifying the solution with potassium hydroxide to obtain the corresponding mercaptide and methylating the mercaptide with dimethyl sulfate.

No references cited.